United States Patent
Kang et al.

(10) Patent No.: US 8,379,621 B2
(45) Date of Patent: Feb. 19, 2013

(54) METHOD FOR ADDRESS ASSIGNMENT IN AD-HOC NETWORK

(75) Inventors: Kyung-lim Kang, Suwon-si (KR); Jae-hoon Kim, Seoul (KR); Jung-ho Kim, Suwon-si (KR); Yong-sung Roh, Icheon-si (KR); Young-gon Choi, Suwon-si (KR); Shubhranshu Singh, Yongin-si (KR); Kee-cheon Kim, Seoul (KR); Dong-keun Lee, Seoul (KR); Hyun-sik Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 407 days.

(21) Appl. No.: 11/220,612

(22) Filed: Sep. 8, 2005

(65) Prior Publication Data

US 2006/0050706 A1   Mar. 9, 2006

(30) Foreign Application Priority Data

Sep. 8, 2004   (KR) .................. 10-2004-0071709

(51) Int. Cl.
*H04J 3/24*   (2006.01)
*H04W 4/00*   (2009.01)
*H04W 36/00*  (2009.01)
*H04L 12/56*  (2006.01)

(52) U.S. Cl. ... 370/349; 370/338; 370/392; 370/395.54; 455/444

(58) Field of Classification Search .................. 370/401, 370/392, 230.1, 409, 475, 349; 455/453
See application file for complete search history.

(56) References Cited

U.S. PATENT DOCUMENTS

| | | | |
|---|---|---|---|
| 6,381,467 B1 * | 4/2002 | Hill et al. ...................... 455/519 |
| 6,667,971 B1 * | 12/2003 | Modarressi et al. .......... 370/352 |
| 6,876,643 B1 * | 4/2005 | Aggarwal et al. ............. 370/338 |
| 6,879,574 B2 * | 4/2005 | Naghian et al. ............... 370/338 |
| 6,937,602 B2 * | 8/2005 | Whitehill et al. ........ 370/395.54 |
| 7,088,727 B1 * | 8/2006 | Short et al. ..................... 370/401 |
| 2002/0013856 A1 * | 1/2002 | Garcia-Luna-Aceves et al. ............................. 709/238 |
| 2004/0103275 A1 * | 5/2004 | Ji et al. .......................... 713/150 |

* cited by examiner

*Primary Examiner* — Huy C Ho
(74) *Attorney, Agent, or Firm* — Sughrue Mion, PLLC

(57) ABSTRACT

In general, an Internet gateway assigns an address to a node of an ad-hoc network on receipt of request for an address assignment. However, a load exerted to the Internet gateway increases. Accordingly, one (proxy node) of the nodes of an ad-hoc network can serve as a proxy node to perform an address assignment function of the Internet gateway. That is, if a node of the ad-hoc node does not receive an advertisement message, it requests the Internet gateway for address assignment to perform the proxy node function. The node is assigned with at least two addresses from the Internet gateway, and then assigns the address to the requesting node. Accordingly, a load exerted to the Internet gateway can be reduced.

13 Claims, 5 Drawing Sheets

METHOD FOR ADDRESS ASSIGNMENT IN AD-HOC NETWORK

CROSS REFERENCE TO RELATED APPLICATION

This application claims the benefit of Korean Patent Application No. 2004-71709, filed on Sep. 8, 2004, in the Korean Intellectual Property Office, the entire contents of which are incorporated herein by reference.

BACKGROUND OF THE INVENTION

1. Field of the Invention

The present invention relates to an ad-hoc network, and more particularly, to a method for assigning an address to a node of the ad-hoc network upon being requested by the node.

2. Description of the Related Art

In a general mobile communication system, a mobile element transmits and receives data to and from a base station. The mobile element and the base station directly transmits and receive data to and from each other without relaying the data to another node. In an ad-hoc network, however, when a source node transmits data to a destination node, it uses another node to transmit the data to the destination node.

The ad-hoc network is a self-configuring network of mobile nodes. The nodes are free to move randomly, and thus, the ad-hoc network changes rapidly and unpredictably. In the ad-hoc network, the nodes are communicable with each other without being supported by an existing mobile communication system, and have no limitation in a communication range if supported by multiple hops.

For various applications of the ad-hoc network, methods for connecting with a server (Internet) have been discussed. Among them, a method of connecting the ad-hoc network to the server using an Internet gateway (IG) has been currently discussed.

FIG. 1 is a view showing a conventional ad-hoc network 100, a router 120, a server 130 and an IG 110 connecting the ad-hoc network 100 and the router 120.

The ad-hoc network 100 consists of a plurality of nodes. For example, as shown in FIG. 1, the ad-hoc network 100 consists of nodes 1 to 7. The nodes 1 to 7 are connected with the IG 110 through a wireless network, and the IG 110 is connected to the server 130 via the router 120. The IG 110 transmits data received from the nodes 1 to 7 to the server 130 and also transmits data received from the server 130 to the nodes 1 to 7.

In order to communicate with the IG 110, the nodes 1 to 7 of the ad-hoc network 100 each has to be assigned with an address from the IG 110. The IG 110 selects one of assignable addresses when being requested for the address assignment from the nodes 1 to 7, and transmits the selected addresses to the requesting node. The address assigned from the IG 110 is usable only in the ad-hoc network. This means that the address is a local address. Suppose that the same local address is used at least two ad-hoc networks. When two nodes are assigned with the same local address and communicate with the server 130, the server 130 cannot distinguish the two nodes.

As described above, the ad-hoc network 100 consists of the plurality of nodes 1 to 7, and the IG 110 assigns an address to a node requesting for address assignment. Since the nodes are free to move in the ad-hoc network 100, the nodes may request the IG 110 for the address assignment at the same time. In this case, the IG 110 has to respond to the all requests for the address assignment from the nodes. Simultaneously, the IG 110 has to relay data between the nodes of the ad-hoc network 100 and the server 130. However, since the IG 110 performs the address assignment function and the data relaying function simultaneously, it is very likely subjected to an excessive load. Accordingly, a method for reducing the load exerted to the IG 110 has been demanded.

SUMMARY OF THE INVENTION

Exemplary embodiments of the present invention have been developed in order to solve the above problems in the related art. Accordingly, an aspect of the present invention is to provide a method of reducing a load of an Internet gate (IG) that manages nodes of an ad-hoc network.

Another aspect of the present invention is to provide a method in which a plurality of nodes of an ad-hoc network are assigned with non-overlapping addresses.

The above aspects are achieved by providing a method in which a node of an ad-hoc network requests an address assignment. The method comprises receiving an "advertisement message" from a proxy node of the ad-hoc network, and requesting the proxy node for an address assignment and being assigned with an address;

The above aspects are also achieved by providing a method in which a node of an ad-hoc network requests an address assignment. The method comprises: requesting an Internet gateway for an address assignment if any "advertisement message" is not received, being assigned with an address band from the Internet gateway, and designating and using one of the addresses of the address band.

The above aspects are also achieved by providing a method in which an Internet gateway assigns an address to a node of an ad-hoc network. The method comprises receiving from a node a request message for assignment of an address comprising a first address and a second address, and transmitting an address band comprising the first address for distinguishing the requesting node and the at least two second addresses to be arbitrarily assigned to the requesting node.

BRIEF DESCRIPTION OF THE DRAWINGS

The above aspects of the present invention become apparent by describing exemplary embodiments of the present invention with reference to the accompanying drawing, in which.

DETAILED DESCRIPTION OF EXEMPLARY EMBODIMENTS OF THE PRESENT INVENTION

Hereinafter, a method in which a node of an ad-hoc network requests an address assignment according to an exemplary embodiment of the present invention will now be described. According to an exemplary embodiment of the present invention, a proxy node serves as an Internet gateway, and especially, performs a function of assigning an address to a node.

The proxy node transmits an "advertisement message" to nodes located within n-hops at a predetermined time interval. The "advertisement message" includes an address of the proxy node. When a node receives the "advertisement message", the node transmits a request for an address assignment to the proxy node, not to the IG. The 'n' can be set according to a user selection. The smaller the n is, the more proxy nodes the ad-hoc network has.

When a node intends to request an address assignment, the node is in a standby mode for a random time and determines whether an "advertisement message" is received, instead of requesting the Internet gateway for the address assignment. Upon receiving the "advertisement message", the node requests the proxy node for the address assignment. If the "advertisement message is not received, the node determines that there is no proxy node within n hops. Therefore, the node transmits a "proxy node function request message" to the Internet gateway to perform a proxy node function.

If the proxy node receives an "advertisement message" from another proxy node, the proxy node does not transmit the "advertisement message" any more. In this case, the proxy node does not return an assigned address band and stores the same. According to a user's setting, the proxy node returns the assigned address band and does not perform the proxy node function. If the proxy node does not transmit the "advertisement message", the nodes which have been already assigned with addresses from the proxy node re-requests another proxy node for an address assignment.

Figure 1:
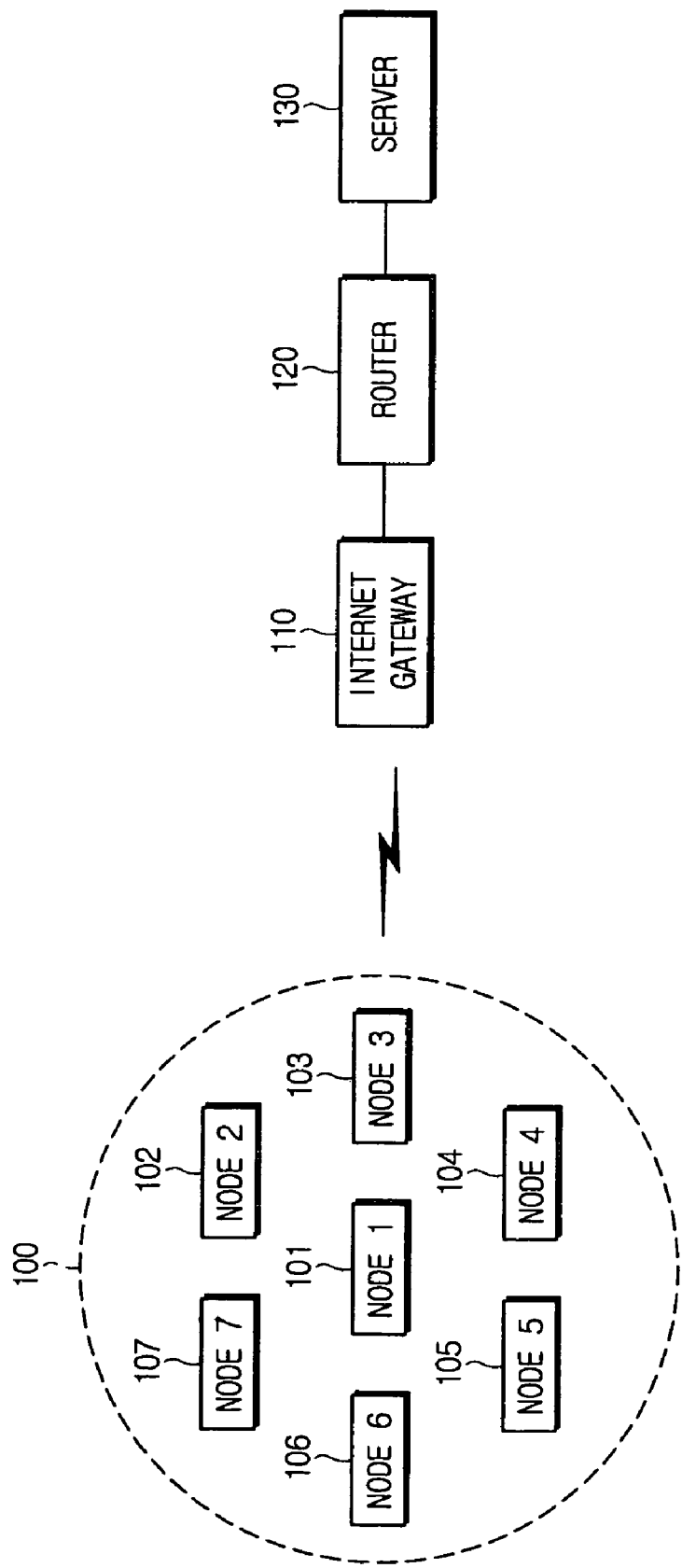
FIG. 1 is a view showing a general ad-hoc network connected to an Internet.
Figure 2:
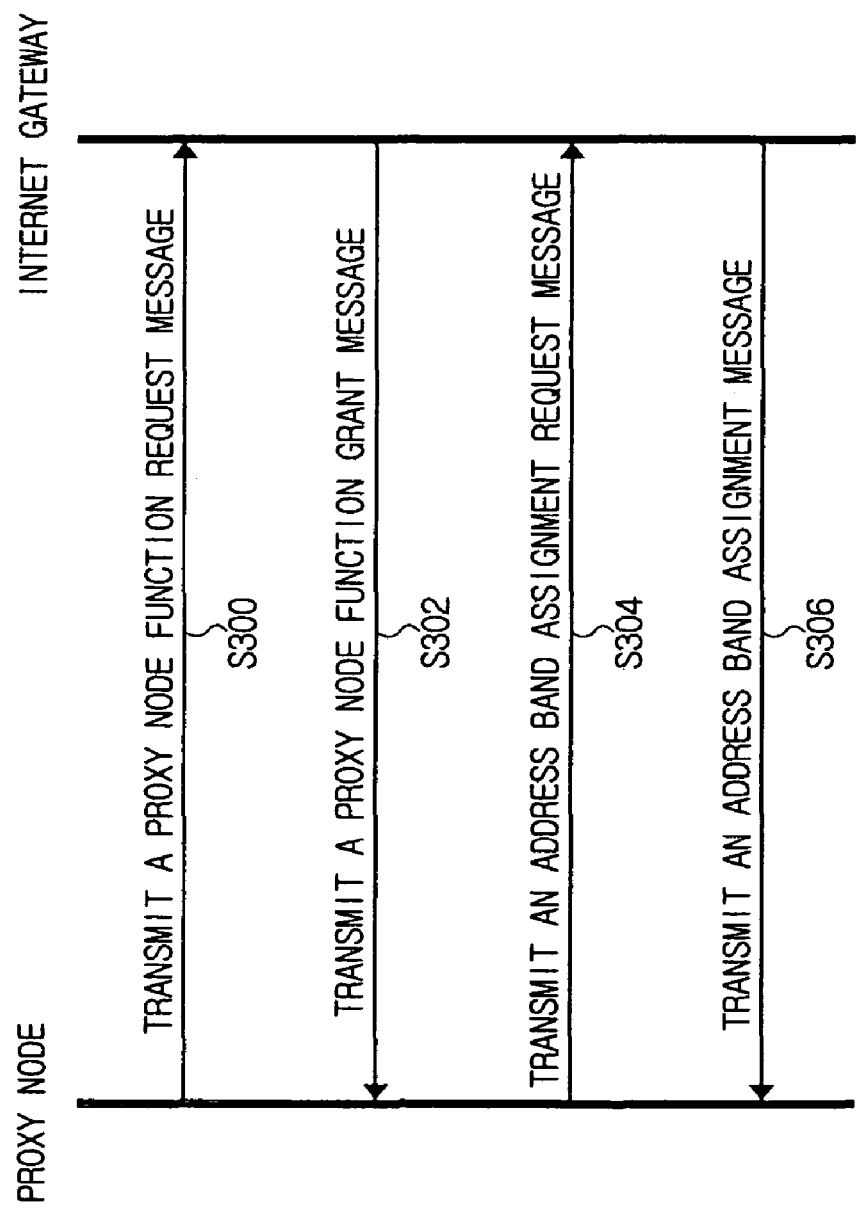
FIG. 2 is a view showing operations performed between a proxy node and an Internet gateway (IG) according to an exemplary embodiment of the present invention.

FIG. 2 is a view showing operations performed between a node that intends to serve as a proxy node and an Internet gateway. Hereinafter, the operations performed will be described with reference to FIG. 2.

At step S300, a proxy node, actually a node intending to serve as a proxy node, transmits "a proxy node function request message" to an Internet gateway. The "proxy node function request message" is to request a proxy node function. At step S302, the Internet gateway transmits "a proxy node function grant message" to the proxy node. The "proxy node function grant message" is to grant the proxy node function to the proxy node.

At step S304, the proxy node transmits "an address band assignment request message" to the Internet gateway. The "addresses band assignment request message" is to request an address band for the proxy node function. At step S306, the Internet gateway transmits "an address band assignment message" to the proxy node. The "address band assignment message" includes information about an address band the proxy node will assign. The "address band assignment message" transmitted to the proxy node from the Internet gateway will be described later.

Although in FIG. 2, the "proxy node function request message" and the "address band assignment request message" are individually transmitted, they may be transmitted in an integrated message form according to a user's setting. If the "proxy node function request message" and the "address band assignment request message" are transmitted in an integrated message form, the "proxy node function grant message" and the "address band assignment message" are also transmitted in an integrated message form.

Figure 3:
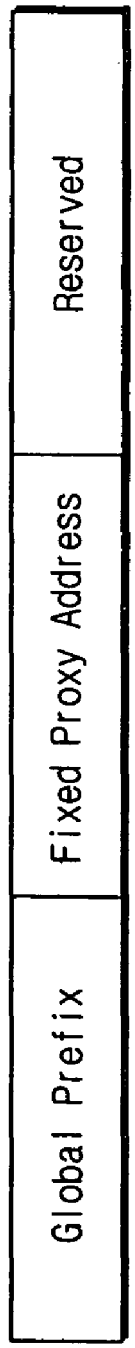
FIG. 3 is a view showing a structure of an address band in which an Internet gateway transmits to a proxy node according to an exemplary embodiment of the present invention.

FIG. 3 is a view showing a frame comprising information about the address band transmitted from the Internet gateway to the proxy node. As shown in FIG. 3, the frame has three sections, i.e., a global prefix, a fixed proxy address and a reserved section. The global prefix consists of 64 bits, the fixed proxy address consists of 58 bits, and the reserved consists of 8 bits. The number of bits of each section can be determined according to a user's setting.

The global prefix indicates a fixed address determined according to the standards, the fixed proxy address indicates a unique address to be assigned by each proxy node, and the reserved section indicates an address which the proxy node assigns to a node requesting the address assignment. Nodes assigned with addresses by a single proxy node have the same global prefix and the same fixed proxy addresses. For example, if the reserved section is 8 bits, the proxy node assigns addresses to 256 nodes. The proxy node selects and uses one of the assigned address bands.

Figure 4:
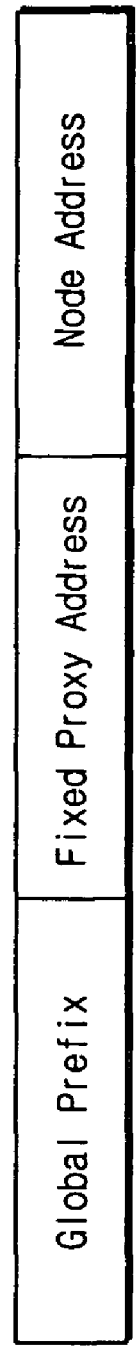
FIG. 4 is a view showing a structure of an address which a proxy node transmits to a node requesting an address assignment.

FIG. 4 is a view showing one example of an address a proxy node assigns to a node requesting an address assignment. As shown in FIG. 4, the address is classified into a global prefix, a fixed proxy address, and a node address. The global prefix and the fixed proxy address are the same as those of FIG. 3. The node address is a unique address that is assigned to the requesting node. For example, if the reserved is 8 bits, assignable addresses range from "0000 0000" to "1111 1111". The proxy node selects one of the assignable addresses and transmits the selected address to the requesting node. The proxy node transmits not only the node address of 8 bits but also the address of 128 bits to the requesting node as shown in FIG. 4. The following table 1 shows one example of a proxy table managed by the proxy node.

| Node | Assigned node address |
|---|---|
| Node 1 | 0000 0000 |
| Node 2 | 0000 0001 |
| . | . |
| . | . |
| . | . |
| Node 9 | 0111 1110 |

According to the table 1, the proxy node manages nodes 1 to 9. Although the above proxy table shows only information about the assigned addresses, other information may be added to this table according to a user's setting. That is, information about the global prefix and the fixed proxy address can be shown in the proxy table. In this case, since the proxy node uses the same global prefix and the same fixed proxy address, the necessity for management of the global prefix and the fixed proxy address node by node decreases. As described above, the proxy node transmits all of the global prefix, the fixed proxy address and the node address to the requesting node, and the requesting node transceives data with the server using the address of 128 bits.

Like the proxy node, the Internet gateway stores a proxy table. The following table 2 shows one example of the proxy table stored in the Internet gateway. For the convenience of explanation, the fixed proxy address shown in the table 2 consists of 10 bits.

TABLE 2

| Proxy node | Assigned fixed proxy address |
|---|---|
| Proxy node 1 | 0000 0000 00 |
| Proxy node 2 | 0000 0000 01 |
| . | . |
| . | . |
| . | . |
| Proxy node 5 | 0000 0001 00 |

According to the table 2, the Internet gateway manages proxy nodes 1 to 5. The Internet gateway distinguishes the proxy nodes using the fixed proxy addresses, and thus, cannot assign the same fixed proxy address to two proxy nodes. Accordingly, the Internet gateway stores the assignable fixed proxy address bands without superimposing one to another. The magnitude of the fixed proxy address band stored in the Internet gateway is determined depending on the number of nodes of the ad-hoc network and the number of nodes transmitting the "advertisement message".

Hereinafter, a process of extending a lifetime of the address assigned to the node will be described.

Figure 5:
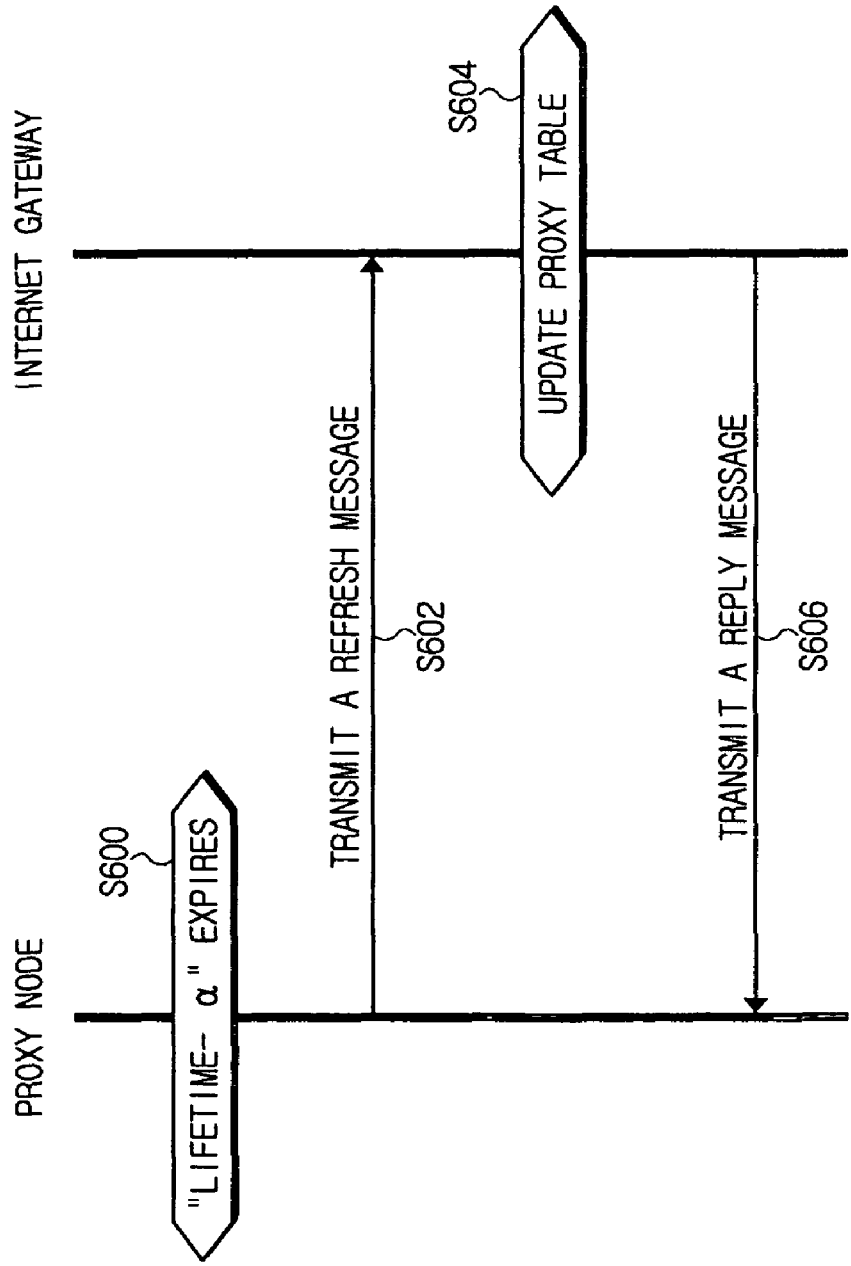
FIG. 5 is a view showing operations performed between a proxy node requesting a lifetime extension and an Internet gateway.

FIG. 5 shows a process of extending a lifetime of an assigned address when a proxy node performs an address assignment function. It is general that the node requests the Internet gateway for the extension of the lifetime of the assigned address and the Internet gateway grants the extension of the lifetime. According to an exemplary embodiment the present invention, however, a node which has been already assigned with an address does not request the Internet gateway for the lifetime extension. Instead, a proxy node requests the lifetime extension.

More specifically, the proxy node determines whether 'lifetime-α' expires at step S600. Albeit not shown in table 2, the Internet gateway transmits an address band and a lifetime with respect to the proxy node that requests the address band. The lifetime indicates a usable duration of the assigned address band. The "a" can be arbitrarily determined by a user. If 'lifetime-α' has expired, the process moves the step S602.

At the step S602, the proxy node transmits a "refresh message". The "refresh message" is to request a lifetime extension with respect to the assigned address. The proxy node requests the Internet gateway for the lifetime extension before the 'lifetime-α' expires. The proxy node can extend the lifetime of the assigned address by transmitting the "refresh message".

At step S604, the Internet gateway updates a proxy table stored therein. That is, the Internet gateway extends the lifetime of the proxy node of the proxy table.

At step S606, the Internet gateway transmits a reply message. The reply message is to grant the lifetime extension as requested.

Through the above-described process, the node, which is assigned with an address from the proxy node, can extend the lifetime of the assigned address without transmitting a "refresh message". Also, since only the proxy node transmits the "refresh message" and receives the reply message, the number of messages transmitted between the node and the Internet gateway can be reduced greatly.

Figure 6:
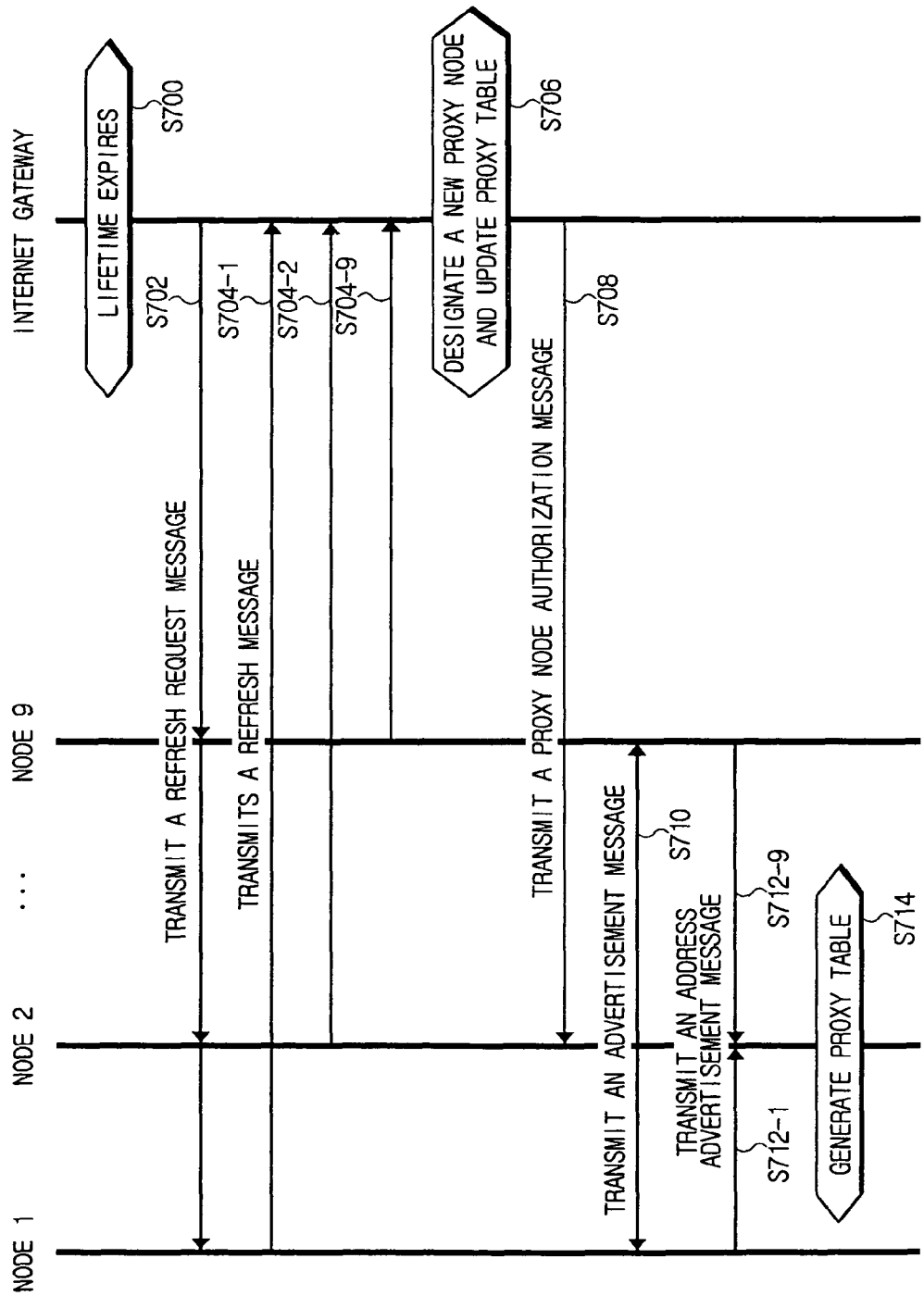
FIG. 6 is a view showing a method in which an Internet gateway designates a new proxy node.

FIG. 6 is a view showing a process of extending a lifetime of an assigned address when a proxy node moves away from an ad-hoc network according to an exemplary embodiment of the present invention. If a proxy node moves away from the ad-hoc network, it cannot perform a proxy node function and also cannot transmit any refresh message. FIG. 6 illustrates a case that addresses are assigned to nodes 1 to 9 before the proxy node moves away from the ad-hoc network.

At step S700, an Internet gateway determines whether a lifetime expires. If so, the process moves to step S702.

At the step S702, the Internet gateway transmits a "refresh request message". The "refresh request message" is to request the nodes assigned with the address transmit the "refresh message".

At step S704-1, the node 1 transmits a "refresh message" to the Internet gateway, and at step S704-2, the node 2 transmits a "refresh message" to the Internet gateway. At step S704-9, the node 9 transmits a "refresh message" to the internet gateway. According to FIG. 6, the nodes 1 to 9 transmit the "refresh messages", but if a node does not need to have an address, the node does not transmit a refresh message. The "refresh message" includes the address of the node transmitting the "refresh message".

The Internet gateway determines that the proxy node escapes from the network by referring to the address included in the received refresh message. That is, the Internet gateway determines that the proxy node escapes from the network by referring to the fixed proxy address. Upon receiving the refresh message, the Internet gateway designates a new proxy node at step S706. At this step, a neighboring node of the proxy node which escapes from the network may be determined as a new proxy node. For example, in FIG. 6, the node 2 is designated as a new proxy node. The Internet gateway updates the proxy table to include information about the new proxy node.

At step S708, the Internet gateway transmits a "proxy node authorization message" to the node 2. The node 2 receives the "proxy node authorization message" and thereby knows that the node 2 is authorized to act as a proxy node.

At step S710, the node 2 transmits an "advertisement message" to nodes existing within n-hops. The "advertisement message" includes information that the node 2 server as a proxy node. At step S712-1, the node 1 transmits an "address advertisement message" to the node 2. At step S712-9, the node 9 transmits an "address advertisement message" to the node 2. The nodes 3 to 8 each also transmit the address advertisement message to the node 2. The nodes 1 and 3 to 9 each distinguishes the address of the node transmitting the previous "advertisement message" and the address of the node transmitting the current "advertisement message" and thereby knows that the node serving as the proxy node is changed. The "address advertisement message" includes information about the addresses used in the respective nodes.

At step 714, the node generates a proxy table based on the address of the received "address advertisement message". Operations after that are the same as described in FIG. 5.

Referring to FIG. 6, the Internet gateway designates a new proxy node upon receiving the "refresh message". However, the Internet gateway may transmit a reply message to the nodes that has transmitted the "refresh message", prior to designating the new proxy node. That is, the Internet gateway may designate the new proxy node after grating the lifetime extension of the requested address.

In FIG. 6, the proxy node escapes from the ad-hoc network. However, the proxy node does not often perform the proxy node function even if the proxy node does not escape from the ad-hoc network. For example, when the proxy node moves from a current area to a different area that is managed by another proxy node, the proxy node does not perform the proxy node function. In this case, the proxy node notifies the Internet gateway that the proxy node does not perform the proxy node function any more prior to moving the different area. Upon receiving the notification, the Internet gateway selects one of the nodes assigned with the addresses by the proxy node and has the selected one perform the proxy node function. Operation after that is the same as at step S706 of FIG. 6.

Exemplary embodiments of the present invention suggests that a proxy node among the nodes of the ad-hoc network is authorized to perform some functions of the Internet gateway. That is, the proxy node assigns address to requesting nodes and thus a load exerted to the Internet gateway is reduced. Also, a concept of 'fixed proxy address' is adopted so that addresses of the plurality of nodes are integrated for the convenience of management. Accordingly, the number of messages to request for lifetime extension and the number of reply messages can be reduced.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method in which a first node of an ad-hoc network requests an address assignment, said method comprising:
the first node requesting an Internet gateway for an address assignment by sending a proxy node function request message if no advertisement message is received, and determining that there is no proxy node within a predetermined number of hops if no advertisement message is received;
being assigned with an address band from the Internet gateway; and
designating and using one of addresses of the address band, wherein the advertisement message is a message informing other nodes that the first node serves as a proxy node.

2. The method as claimed in claim 1, wherein the first node transmits an advertisement message to at least one node existing within a predetermined number of hops, and if the first node receives a request for the address assignment from the at least one node receiving the advertisement message, the first node designates an assignable address from the address band and assigns the assignable address.

3. The method as claimed in claim 2, wherein the address band comprises a first address for distinguishing the at least one node assigned with the address band and at least two second addresses arbitrarily assigned to the first node.

4. The method as claimed in claim 3, wherein the first node assigns the address comprising the first address and the at least two second addresses to the at least one node requesting the address assignment.

5. The method as claimed in 4, wherein the at least two second addresses comprise at least one bit, and the first node transmits the second addresses to the requesting at least one node, the second addresses having a bit value different from a previously assigned bit value.

6. The method as claimed in claim 1, wherein the first node stores information about the requesting at least one node and the assigned addresses of the requesting at least one node.

7. The method as claimed in claim 1, wherein the first node transmits to the Internet gateway a message to request an extension of a lifetime of the assigned address band.

8. A method in which an Internet gateway assigns an address to a node of an ad-hoc network, the method comprising:
at the Internet gateway, receiving from a first node a proxy node function request message for assignment of a combined address comprising at least a first address and a second address, if no advertisement message is received by the first node, and determining that there is no proxy node within a predetermined number of hops if no advertisement message is received; and
transmitting an address band comprising the first address for distinguishing the requesting first node and the second address to be arbitrarily assigned to the requesting first node,
wherein the Internet gateway stores assignable first address bands without superimposing one on another,
wherein the first node transmits an advertisement message including information that the first node serves as a proxy node to other nodes, when the first node receives the address band.

9. The method as claimed in claim 8, wherein an identifier of a second node transmitting the address stores the first address transmitted to the requesting first node.

10. The method as claimed in claim 8, further comprising, if an address lifetime extension is not requested by the second node transmitting the address and the lifetime expires, inquiring of the first node assigned with the first address as to whether to extend the lifetime of the address.

11. The method as claimed in claim 10, further comprising designating one of nodes requesting the address lifetime extension and authorizing the designated node to manage addresses of nodes assigned with the first address.

12. The method as claimed in claim 11, wherein the designated node is notified of an address including the second addresses from the nodes assigned with the first address.

13. The method as claimed in claim 11, further comprising, if a node is newly designated for address management, updating an identifier of at least one of the nodes assigned with the first address to an identifier of the newly designated node.

* * * * *